Dec. 29, 1936.  H. S. JANDUS  2,065,806
BUFFER PLATE CONSTRUCTION
Filed April 17, 1933
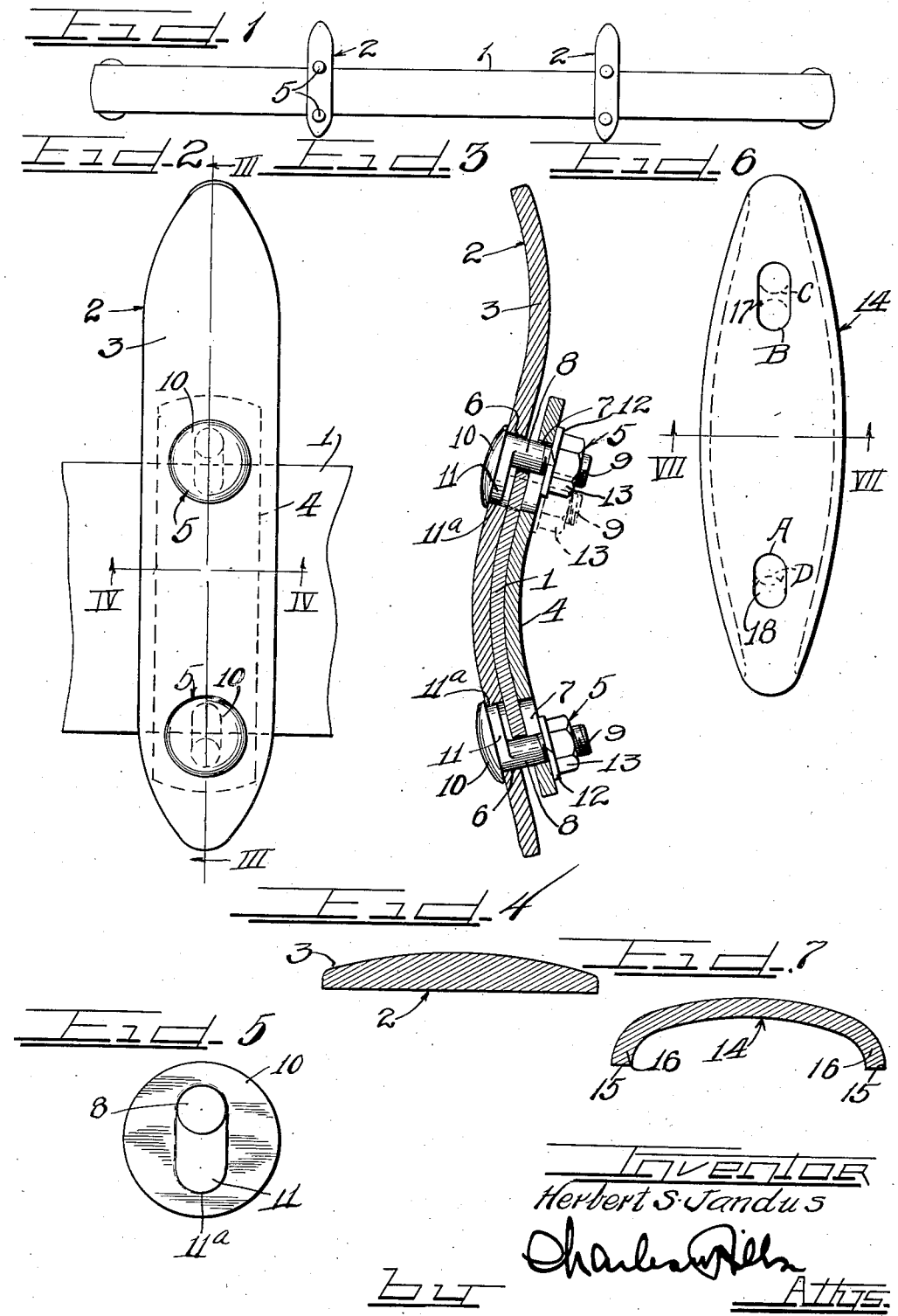
Inventor
Herbert S. Jandus
by Charles W. Allen
Attys.

Patented Dec. 29, 1936

2,065,806

UNITED STATES PATENT OFFICE 2,065,806

BUFFER PLATE CONSTRUCTION

Herbert S. Jandus, Detroit, Mich., assignor to General Spring Bumper Corporation, Detroit, Mich., a corporation of Michigan Application April 17, 1933, Serial No. 666,397

5 Claims. (Cl. 293—55)

This invention has to do with automobile bumpers and concerns itself particularly with a device for use in conjunction with a bumper to augment the range of effectiveness thereof and to prevent overriding of bumpers of colliding vehicles.

Due to the lack of standardization of the height of bumpers from the ground, and to, among other things, the variation of the height of bumpers resulting from the use of tires of different sizes, it is a frequent occurrence for impact bars of colliding cars to ride one over the other. This results in injury to adjacent vehicle lamps and parts of the bodies of the cars, and in an interlocking of bumpers which are separated only with great difficulty and inconvenience.

Past attempts to solve this difficulty have met with indifferent or no success, due to complexity of construction and expense in manufacturing, difficulty of assembly and attachment in place, and have involved constructions which could not be used with bumpers of different widths.

It is therefore one of the objects of the present invention to provide a device formed to substantially increase the effective vertical range through which a bumper of another car can move without interlocking with the bumper provided with such a device and embodying means whereby the device is applicable to bumpers of different widths.

It is another object of the invention to provide a bumper with a buffer device independent of the mounting means of the bumper and including means whereby the same may be readily removed from a bumper having one width and firmly secured to another bumper of a different width.

Another object of the invention resides in the provision of a metallic buffer plate construction which is ornamental and provided with means for positively preventing angular movement of the construction relative to the bumper bar on which the same is mounted.

It is a still further object of the invention to provide a buffer plate construction embodying means whereby the same may be securely clamped to bumpers of different sizes, including a retainer for use irrespective of the size of the bumper to which the device is attached.

Another object of the invention involves the provison of a buffer device capable of being securely attached with equal facility to bumpers of different thicknesses and in any desired location lengthwise of the bumper.

In carrying out the invention into practice, the buffer device is formed preferably as an elongated strip or bar whose length is substantially greater than the height or vertical width of bumper impact bars. The strip is preferably formed with spaced openings extending longitudinally of the strip. Eccentrically headed bolts are formed to have their heads fit in the openings, and by reversing the position of one or both of the heads in the respective openings, variations in the spaces between the shanks of the bolts may be effected. The device is positioned on a bumper bar so that the bumper bar is disposed between the shanks of the bolts and adjacent thereto, and retainer means is provided to be positioned between the nuts on the bolts and the bumper bar to thereby effectively hold the bumper bar and buffer device in place.

The buffer plate may be formed in different sectional shapes for use with bumpers of corresponding shapes, and the eccentric means is capable of manipulation to enable the plate to extend varying amounts above or below the bumper bar, as the case may be.

Further objects and advantages of the invention will appear as the description proceeds.

This invention (in preferred forms) is illustrated in the drawing and hereinafter more fully described.

Figure 1 is an elevational view of a bumper equipped with a pair of guards or buffers embodying the principles of the present invention.

Figure 2 is a fragmentary enlarged elevational view of a portion of Figure 1, including one of the buffers.

Figure 3 is a sectional view taken substantially in the plane designated by the line III—III in Figure 2, certain parts being shown for convenience in elevation, and showing a different adjustment in dotted lines.

Figure 4 is an enlarged transverse sectional view through the buffer shown in Figure 2, taken substantially as designated by the line IV—IV in Figure 2.

Figure 5 is an end elevation, somewhat enlarged, of an eccentric bolt forming a part of this invention, looking at the free end of the shank.

Figure 6 is a view of a buffer plate of modified construction.

Figure 7 is an enlarged cross sectional view taken substantially as designated by the line VII—VII in Figure 6.

Referring now more particularly to the drawing, a bumper which for illustrative purposes only is shown as embodying a single impact bar 1 of transversely arcuate form is equipped with a pair of buffer devices 2 constructed in accordance with the principles of the present invention according to one form. At the outset, it is understood that the bumper may be constructed to include either a single impact bar or a plurality of impact bars, and the impact bar or bars may be integral or of the built up type. For the purpose of explaining the present invention, the buffer plate constructions are formed to accommodate the impact bar 1, but it is to be understood that the principles of the invention may be retained even though the shapes of the particular impact bars in connection with which the buffer devices made in accordance with the present invention are used may vary. For example, in the event the impact bar is of rectilinear cross section instead of arcuate cross section, it is to be understood that the buffer device portions associated directly or indirectly with the bumper bar may be correspondingly shaped.

Each buffer construction 2 comprises a preferably elongated strip 3 which may be made of bar spring steel or otherwise, a retainer strip 4 and novel fastening means 5 associated therewith. The strips 3 and 4 are formed with longitudinally spaced elongated openings 6 and 7, respectively, the openings in each strip substantially registering with the openings in the other strip.

The fastening means consists of a bolt having a shank 8 threaded at its free end 9 and formed with an offset head 10 which may be circular as shown or have any other desired shape. The head 10 is formed with an elongated boss 11 thereunder, said boss in the illustrated embodiment of the invention constituting a continuation of the portion of the shank adjacent the head and said boss and shank being formed to fit freely in the openings 6. The size of the head 10 is such that it completely covers the opening 6 and overlaps the same as clearly shown in Figures 2 and 3. The shank 8 is adapted not only to fit in the opening 6 in the buffer strip 3 but also to fit in and pass through the retainer opening 7 and project rearwardly beyond, and is equipped with a lock washer 12 and nut 13 for clamping and securing purposes.

The openings in the respective strips 3 and 4 are spaced apart a predetermined distance which is controlled by the width of the bumper impact bar 1 or by the distance between its upper and lower edges or limits. For example, the openings 6 may be assumed to be spaced apart, from the lower end of the upper opening to the upper end of the lower opening, a distance substantially equal to the width of the narrowest bumper impact bar to be accommodated by the buffer plate construction 2. The length of each opening 6 may be varied as desired, to thereby provide for different adjustments, but as shown is slightly in excess of twice the diameter of the shank 8. With the upper fastening means 5 arranged as shown in dotted lines in Figure 3 and the lower fastening means 5 reversed from the position shown in full lines in Figure 3 so that it is arranged with the boss 11 thereof extending downwardly, it will be observed that the width of the impact bar 1 accommodated by and between the shanks 8 will be the smallest to be accommodated by the construction.

Now assuming the lower fastening means 5 to be arranged as shown in full lines in Figure 3 and the upper fastening means 5 arranged as shown in dotted lines in Figure 3, it will be noted that the width of impact bar accommodated between the shanks of the respective fastening means will have been increased by substantially the overhang of the boss 11 with respect to the shank 8 of the lower fastening means, or, otherwise stated, by the difference between the length of the lower opening 6 and the diameter of the lower shank 8. To accommodate a still wider impact bar, the bolts are arranged as shown in full lines in Figure 3 and as also shown in Figure 2. With the bolts thus arranged it is evident that the width of bar received between the shanks 8 is increased over that in the last previous mentioned arrangement of the shanks, by substantially the overhang of a boss 11 or, otherwise stated, by substantially the difference between the length of an opening 6 and the diameter of a shank 8.

It is obvious that in the event the size of the openings 6 is the same, three substantially different widths of impact bar may be employed in connection with the same buffer construction. Should one of the holes be made longer than the other, then four substantially different widths of impact bar will be accommodated between the shanks of the bolts, and this is brought out clearly in conjunction with the following description in connection with the form of the invention shown in Figures 6 and 7.

The buffer construction is assembled in position upon the bumper impact bar as follows:

Assuming for the sake of illustration only that the impact bar is of the substantially maximum width to be accommodated with the particular buffer construction under consideration, as shown in Figures 2 and 3, the bolts are positioned in the openings 6 in the impact buffer strip 3 in accordance with the illustration of Figure 3, the shank 8 of the upper bolt being uppermost and the shank 8 of the lower bolt being lowermost. The strip 3 with the bolts thus positioned therein is then placed against the front or impact surface of the bar 1 with the shanks 8 of the bolts respectively arranged over the upper and under the lower edge of the impact bar 1 and with said shanks extending rearwardly. The retainer or clamp plate 4 is positioned with its convex surface adjacent the concave rear surface of the impact bar 1 and slipped forwardly over the shanks 8 to the position shown. The lock washers 12 and nuts 13 are then applied over the threaded ends 9 of the bolts and are tightened up.

The bolts and openings in the strips 3 and 4 are arranged to loosely interfit so that there will be no binding in case of manufacturing variations in the sizes of the parts. That is, while a bumper may be designed for a width of, for example, three inches, there is always a possibility where no machining is performed, that the member may vary slightly from the designed dimension.

The bolt construction may effectively cooperate with the remaining parts of the device by providing, instead of the boss 11 integral with the shank 8, a knob or projection located at the extremity 11a of the boss which is remotest from the shank 8.

The strip 3 is shown with its upper part extending above the impact bar 1 a substantially greater distance than the lower part thereof extends below the bar 1. It will be appreciated, however, that the amounts may be varied so long as they are sufficient to accomplish their purpose in preventing overriding of colliding impact bars. The variations in heights of bumper bars from the ground are appreciable as heretofore explained, but they nevertheless are arranged approximately, varying in perhaps extreme cases to several inches, fifteen inches from the ground. The length of the strip 3 is accordingly chosen so that the strip extends beyond the extreme upper and lower limits of the bars of different cars, so that there is no likelihood whatever of the colliding impact bars overriding each other.

It is often the case that the rear bumper of a car is located at a greater height than the front impact bar, due usually to the fact that the rear part of the automobile frame is raised to clear the rear axle and the rear bumper is secured to the rear part of the frame. It may accordingly be advantageous to form the buffers as shown in Figures 1, 2 and 3 with a major portion of the buffer extending above the front impact bar, and to arrange the buffers on the rear impact bar so that a major portion of each buffer extends below the lower limit of the impact bar of the rear bumper.

It may be desired to employ a buffer device including an impact plate or strip of substantially channel cross section as shown in Figures 6 and 7. The front face of such a plate 14 may be formed in any desired ornamental or other shape and the edges 15 of the flange portions 16 are preferably shaped to conform to the transverse curvature of the impact surface of the bumper bar to which the plate 14 is to be applied. In the illustrated embodiment of the invention the bumper bar 1 has a transversely convex surface and the edges 15 of the flange portions 16 are therefore correspondingly curved to accommodate such convex surface. The plate 14 is provided with elongated openings which may be of the same size or may be of different sizes as shown at 17 and 18. When the openings are of different sizes, the sizes of the bolt heads and bosses to be used in conjunction therewith will be correspondingly different in order that the opening 7 may be covered by the bolt head and the bolt shank fit therein, and in order that the opening 18 may be correspondingly covered and cooperated with by the correspondingly formed bolt. The clamp plate to be used in conjunction with the buffer plate 14 may be of the same form as that shown at 4 in Figures 2 and 3, or may be formed with differently sized holes corresponding with the sizes of the holes 17 and 18. In all other respects the construction and method of assembly of the buffer plate structure shown in Figures 6 and 7 is the same as that shown in the other views.

The number of buffer plate constructions employed with a bumper may vary as desired, and it has been found from experience that two such devices arranged substantially symmetrically on opposite sides of the center of the bumper may be used to advantage. If desired, however, such a device may also be provided at the center of the bar.

By employing holes 17 and 18 of different lengths, it will be observed that four substantially different widths of bumper impact bar may be accommodated by the construction shown in Figures 6 and 7. That is, the smallest width of bumper would be determined by the distance A B, representing the facing portions of the bolt shanks when disposed respectively lowermost in the upper opening 17 and uppermost in the lower opening 18. With the shank in the lower opening 18 turned to the lowermost position in said opening, so that its upper limit is at D, the plate 14 will accommodate a bumper impact bar of a width B D. With the upper limit of the lower bolt shank again at A and the lower limit of the upper bolt shank at C, the width of impact bar accommodated is represented by the distance A C. With the shanks in the respective openings disposed so that lower and upper limits respectively are indicated by the characters C D, the width of impact bar accommodated with such an adjustment is represented by the distance C D.

It is to be noted that the construction, embodied in both forms, is such that when the buffer plate is properly secured in position on a bumper impact bar, there is no likelihood of wobbling or tilting of any of the parts, due, aside from the fact that the parts are held securely by the fastening means, to the fact that the members engage one another along portions of cylindrical surfaces, whereby each plate serves as a means for preventing canting or twisting of the others with respect thereto.

It will be understood that the boss 11 and opening 6 need not be elongated, but may be circular or of any other desired shape, provided that the shank is relatively eccentric. Thus even if the boss is circular, the walls of the elongated opening 7 in which the shank fits will maintain the shank in its lowermost or uppermost position, according to the desired adjustment. The elongated opening 6 is preferable, however, since it facilitates assembly by accurately positioning the shanks so that they readily fit into the openings 7 in the clamp plate 4.

It is to be understood that the shank could be coaxial with the head, and the boss could then be shorter than shown, for a given size bolt. With such a construction, the overall length of the boss, including the shank, measured in a direction transverse to the shank, would be less than that shown, and hence the degree of adjustment would be smaller. The principle of the invention would be substantially the same, however.

The retainer plate openings 7 need not be elongated to conform to the openings 6 in the buffer plate 3, but may be shaped otherwise, since the elongated openings in the latter alone serve to properly position the bolt shanks. The buffer or guard is preferably projected forwardly at one end to provide an abutment for receiving an opposing bumper or other object and resist movement of the latter in the direction of the abutment.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A buffer for augmenting the vertical range of protection afforded by an automobile bumper and applicable to bumpers of different widths, said buffer comprising an impact member provided with an opening for accommodating a fastening element, and means for clamping said member to the bumper, said means including a fastening element having a shank formed to extend through said opening and provided with means on its external end to overlie said opening and engage an outer side of said member, said shank having a cross-section substantially smaller than said opening so that said shank and opening may be relatively shifted to adapt the buffer to bumpers of different widths.

2. A buffer for augmenting the vertical range of protection afforded by an automobile bumper and applicable to bumpers of different widths, said buffer comprising an impact member provided with an opening for accommodating a fastening element, and means for clamping said member to the bumper, said means including a fastening element having a shank formed to extend through said opening and provided with means on its external end to overlie said opening and engage an outer side of said member, said shank having a cross-section substantially smaller than said opening so that said shank and opening may be relatively shifted to adapt the buffer to bumpers of different widths, said member and element being formed so as to prevent undesired relative shifting between said shank and opening.

3. In combination, a bumper bar, a buffer bar for attachment thereto, one of said bars having a slot extending at an angle to the bumper bar, and means for clamping the bars together, said clamping means including a fastening element extending through the slot and having a cross-sectional size less than that of the slot so that the position of the element in said slot may be varied to relatively adjust said buffer bar transversely of the bumper bar.

4. In combination, a bumper bar, a buffer bar of greater length than the width of said bumper bar and extending transversely thereof, said buffer bar having upper and lower elongated slots extending at an angle with the bumper bar, and a clamping element associated with each slot, each clamping element having a portion extending through the respective slot in engagement with one end thereof and with the adjacent edge of the bumper bar, and means on each clamping element engaging the other end of the respective slot whereby to positively hold the said buffer bar against transverse movement on said bumper bar.

5. In combination, a bumper bar, a buffer bar of greater length than the width of said bumper bar and extending transversely thereof, said buffer bar having upper and lower elongated slots extending at an angle to the bumper bar, and a clamping element associated with each slot for clamping the buffer bar to the bumper bar, each clamping element having abutting engagement with the ends of the respective slot and having a portion extending through the slot into engagement with the adjacent edge of the bumper bar.

HERBERT S. JANDUS.